(12) United States Patent
Horst (10) Patent No.: US 8,967,171 B2
(45) Date of Patent: Mar. 3, 2015

(54) BABY CARRIAGE WITH DUAL CANOPY MECHANISMS

(71) Applicant: Andrew J. Horst, West Lawn, PA (US)

(72) Inventor: Andrew J. Horst, West Lawn, PA (US)

(73) Assignee: Wonderland Nurserygoods Company Limited, Kwai Chung, N.T. (HK)

(*) Notice: Subject to any disclaimer, the term of this patent is extended or adjusted under 35 U.S.C. 154(b) by 0 days.

(21) Appl. No.: 13/853,046

(22) Filed: Mar. 28, 2013

(65) Prior Publication Data

US 2013/0255736 A1 Oct. 3, 2013

Related U.S. Application Data

(60) Provisional application No. 61/686,037, filed on Mar. 29, 2012.

(51) Int. Cl.
*E04H 15/06* (2006.01)
*B62B 5/00* (2006.01)

(52) U.S. Cl.
CPC .................. *B62B 5/0013* (2013.01)
USPC ............. 135/88.02; 135/88.04; 297/184.17

(58) Field of Classification Search
USPC ............. 135/88.01, 88.02, 88.03, 88.04; 280/647, 650; 297/184.1, 184.11–17
See application file for complete search history.

(56) References Cited

U.S. PATENT DOCUMENTS

| | | | |
|---|---|---|---|
| 1,671,774 A | 5/1928 | Mcintosh | |
| 1,707,186 A | 3/1929 | Chatfield | |
| 5,188,380 A * | 2/1993 | Tucek | 280/30 |
| 6,431,579 B1 * | 8/2002 | Kaneko et al. | 280/642 |
| 6,443,522 B1 * | 9/2002 | Kain et al. | 297/184.17 |
| 6,752,405 B1 * | 6/2004 | Wright | 280/47.38 |
| 6,764,133 B2 * | 7/2004 | Osato | 297/217.4 |
| 7,032,922 B1 | 4/2006 | Lan | |
| 7,871,100 B2 | 1/2011 | Chen | |
| 8,157,273 B2 | 4/2012 | Bar-Lev | |
| 8,251,382 B2 | 8/2012 | Chen | |
| D686,541 S | 7/2013 | Lai | |
| 8,585,075 B2 | 11/2013 | Zhong | |
| 8,651,502 B2 | 2/2014 | Winterhalter | |
| 8,727,370 B2 | 5/2014 | Tsai | |
| 2002/0033588 A1 | 3/2002 | Kaneko | |
| 2005/0167951 A1 | 8/2005 | Zhen | |
| 2007/0194545 A1 | 8/2007 | Van Dijk | |

(Continued)

FOREIGN PATENT DOCUMENTS

| | | |
|---|---|---|
| CN | 202518316 U | 11/2012 |
| DE | 295 06 226.6 U1 | 7/1995 |

(Continued)

*Primary Examiner* — Noah Chandler Hawk
(74) *Attorney, Agent, or Firm* — Winston Hsu; Scott Margo (57) ABSTRACT

A baby carriage includes a frame, a first canopy mechanism and a second canopy mechanism. The frame includes a first side tube, a second side tube, and a central tube located between the first side tube and the second side tube. The first canopy mechanism includes a first canopy, a first side socket connected on the first side tube, and a first central socket connected on the central tube, wherein opposite ends of the first canopy are connected to the first side socket and the first central socket respectively. The second canopy mechanism includes a second canopy, a second side socket connected on the second side tube, and a second central socket connected on the central tube, wherein opposite ends of the second canopy are connected to the second side socket and the second central socket respectively.

11 Claims, 12 Drawing Sheets

(56) References Cited

U.S. PATENT DOCUMENTS

| | | |
|---|---|---|
| 2009/0235964 A1* | 9/2009 | Troutman et al. ............... 135/16 |
| 2010/0052277 A1 | 3/2010 | Zehfuss |
| 2011/0163519 A1 | 7/2011 | Van Gelderen |
| 2012/0118516 A1 | 5/2012 | Macauley |
| 2012/0193950 A1* | 8/2012 | Winterhalter et al. ... 297/184.13 |

FOREIGN PATENT DOCUMENTS

| | | |
|---|---|---|
| DE | 20 2007 017 310 U1 | 6/2008 |
| DE | 20 2009 005 213 U1 | 1/2010 |
| DE | 10 2010 011 620 A1 | 9/2010 |
| DE | 20 2013 100 540 U1 | 4/2013 |
| EP | 1 190 930 A2 | 3/2002 |
| EP | 1 190 930 A3 | 6/2003 |
| EP | 1 700 770 A1 | 9/2006 |
| EP | 2 258 601 A1 | 12/2010 |
| GB | 2 193 692 A | 2/1988 |
| GB | 2 444 427 A | 6/2008 |
| JP | 2001260894 A | 9/2001 |
| WO | 2007131222 A2 | 11/2007 |
| WO | 2007131222 A3 | 11/2007 |

* cited by examiner

BABY CARRIAGE WITH DUAL CANOPY MECHANISMS

CROSS REFERENCE TO RELATED APPLICATIONS

This application claims the benefit of U.S. Provisional Application No. 61/686,037, which was filed on Mar. 29, 2012, and is incorporated herein by reference.

BACKGROUND OF THE INVENTION

1. Field of the Invention

The invention relates to a baby carriage and, more particularly, to a baby carriage with dual canopy mechanisms.

2. Description of the Prior Art

Many current duo strollers have dual canopies to cover the stroller seats. These canopies are jointed in a central hub that mounts to a central handle frame. Because this central hub contains the mechanics for two canopies, it is often wide and protrudes into the child seating areas. Aside from limiting space, this protrusion can also be a hazard for the child's head. Furthermore, because the canopies are jointed by the central hub, each of the canopies cannot be removed independently, which limits their use.

SUMMARY OF THE INVENTION

An objective of the invention is to provide a baby carriage with dual canopy mechanisms, so as to solve the aforesaid problems.

According to an embodiment of the invention, a baby carriage comprises a frame, a first canopy mechanism and a second canopy mechanism. The frame comprises a first side tube, a second side tube and a central tube, wherein the central tube is located between the first side tube and the second side tube. The first canopy mechanism comprises a first canopy, a first side socket and a first central socket, wherein the first side socket is connected on the first side tube, the first central socket is connected on the central tube, and opposite ends of the first canopy are connected to the first side socket and the first central socket respectively. The second canopy mechanism comprises a second canopy, a second side socket and a second central socket, wherein the second side socket is connected on the second side tube, the second central socket is connected on the central tube, and opposite ends of the second canopy are connected to the second side socket and the second central socket respectively. The first central socket and the second central socket stand side by side on the central tube.

In this embodiment, the central tube has a central axis, the first central socket has a first pivotal portion, an end of the first canopy is connected to the first pivotal portion, the second central socket has a second pivotal portion, an end of the second canopy is connected to the second pivotal portion, and the first pivotal portion and the second pivotal portion are arranged at opposite sides of the central axis, respectively.

In this embodiment, the first central socket further has a first fixing portion connected on the central tube, the first pivotal portion is pivotally connected to the first fixing portion, the second central socket further has a second fixing portion connected on the central tube, the second pivotal portion is pivotally connected to the second fixing portion, and the first fixing portion and the second fixing portion are arranged top and bottom along the central axis.

In this embodiment, the first canopy is removable from the first side socket and the first central socket, and the second canopy is removable from the second side socket and the second central socket.

As mentioned in the above, the baby carriage of the invention is equipped with two individual canopy mechanisms (i.e. the aforesaid first and second canopy mechanisms) for installing two canopies. Since the first pivotal portion and the second pivotal portion are arranged at opposite sides of the central axis of the central tube, and the first fixing portion and the second fixing portion are arranged top and bottom along the central axis of the central tube, the two canopy mechanisms can get closer to each other on the central tube such that the overall width of the two canopy mechanisms on the central tube is greatly reduced. Accordingly, the two canopy mechanisms occupy less space than the conventional canopy mechanisms. Furthermore, the invention allows any one of the first and second canopies to be removed along with the first and second canopy mechanisms individually and does not hinder the usage of the other canopy, so as to increase their use.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
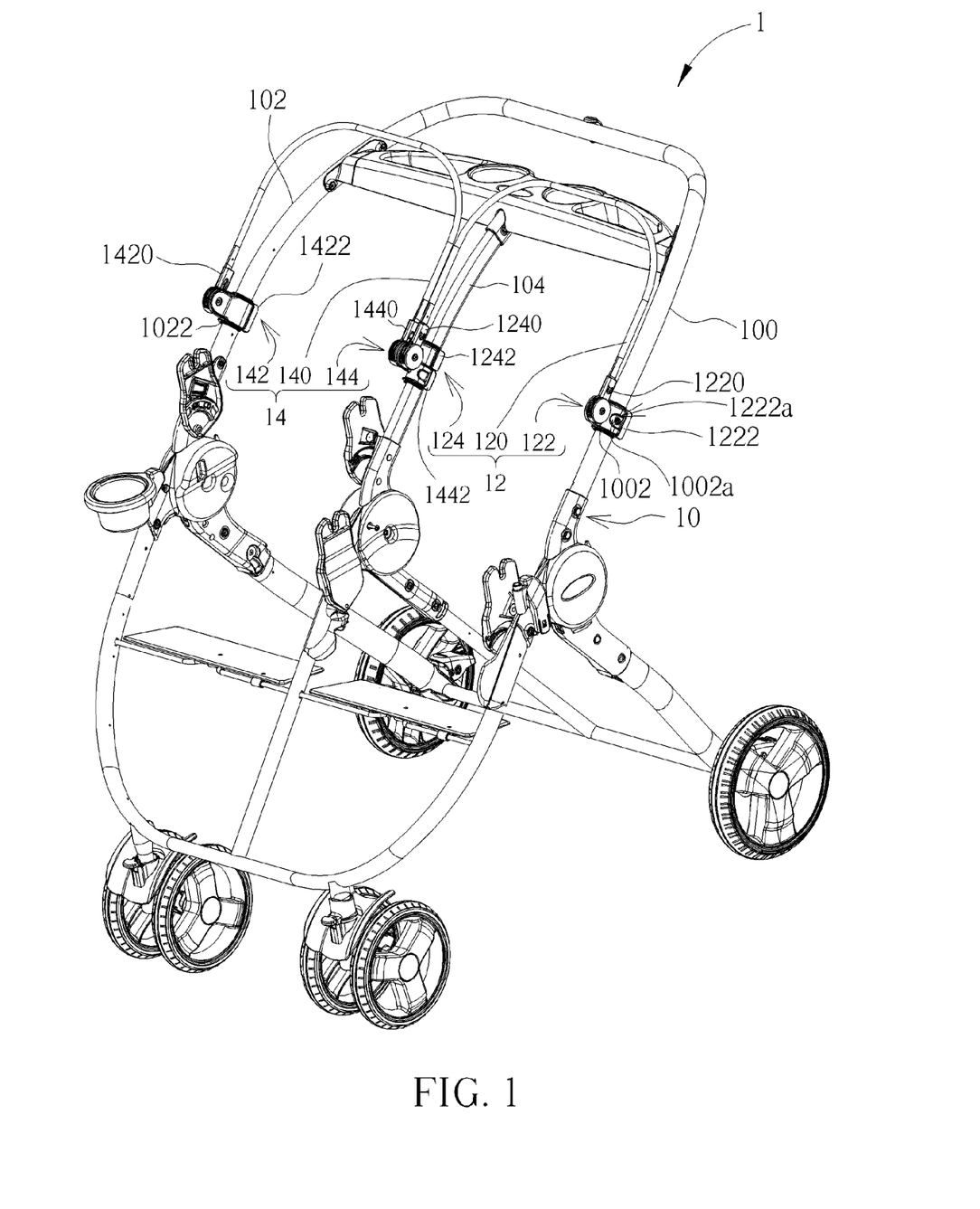
FIG. 1 is a perspective view illustrating a baby carriage according to an embodiment of the invention.
Figure 2:
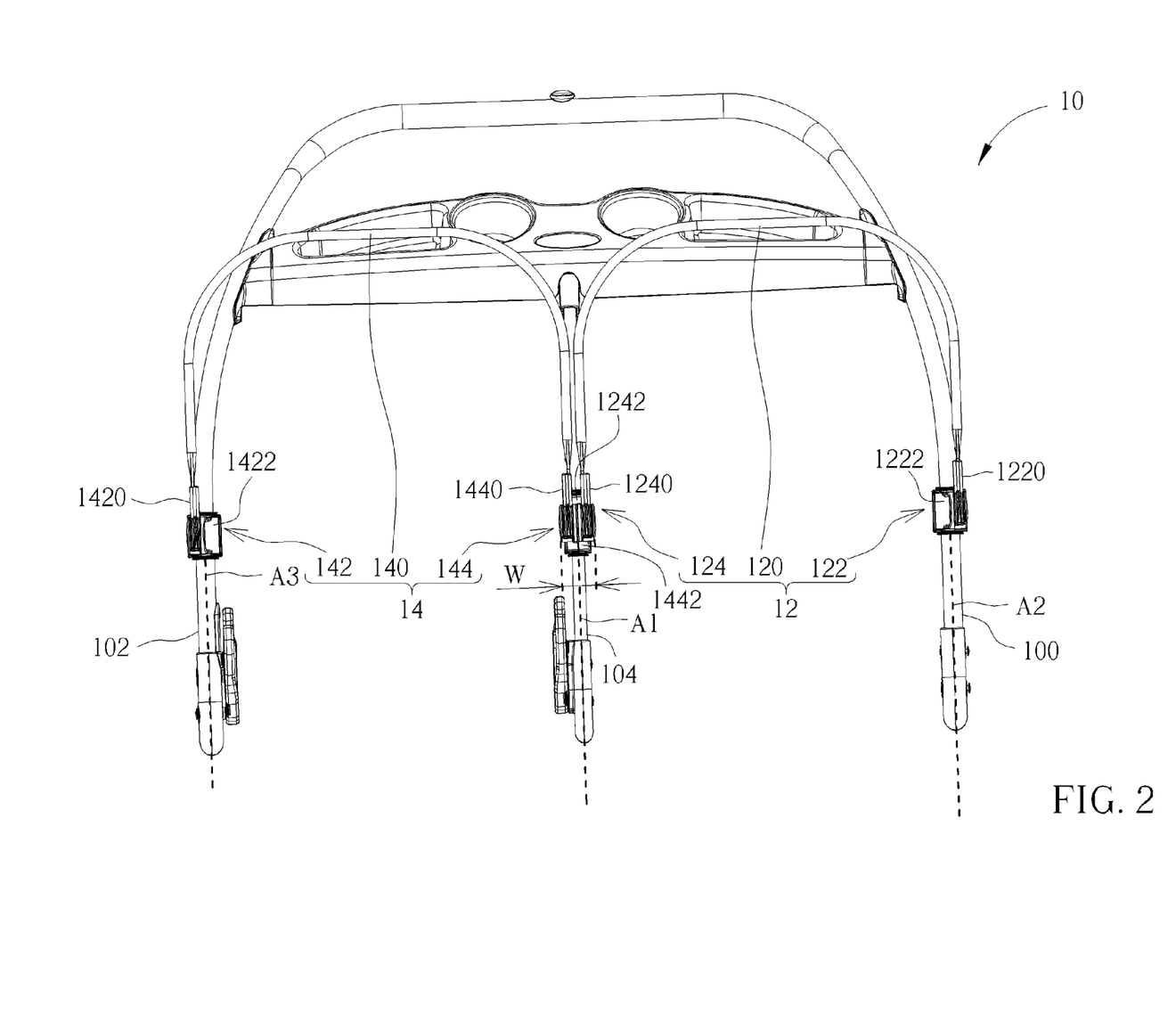
FIG. 2 is a front view illustrating an upper part of the baby carriage shown in FIG. 1.
Figure 3:
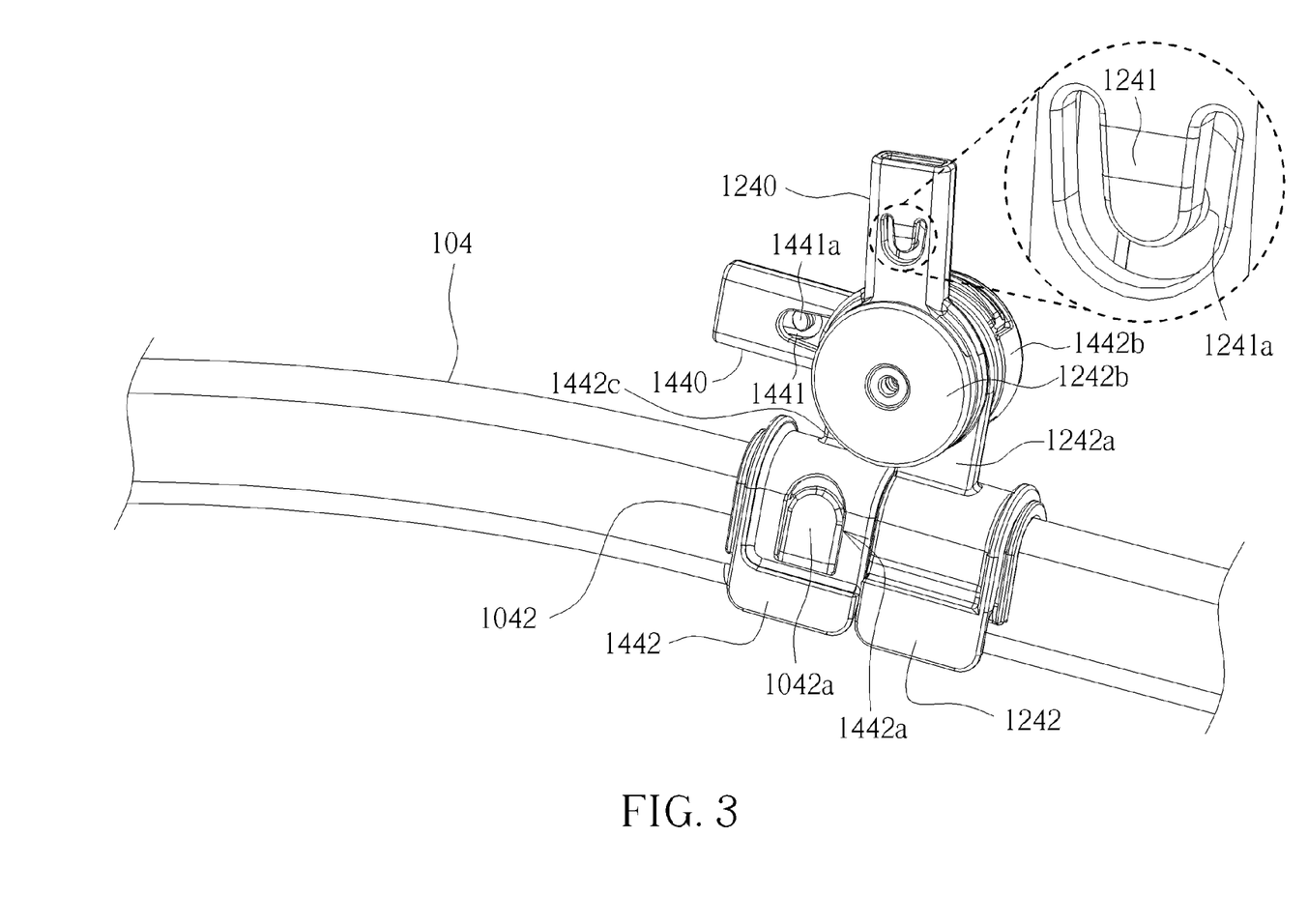
FIG. 3 is an enlarged side view illustrating the first fixing portion and the second fixing portion shown in FIG. 1.
Figure 4:
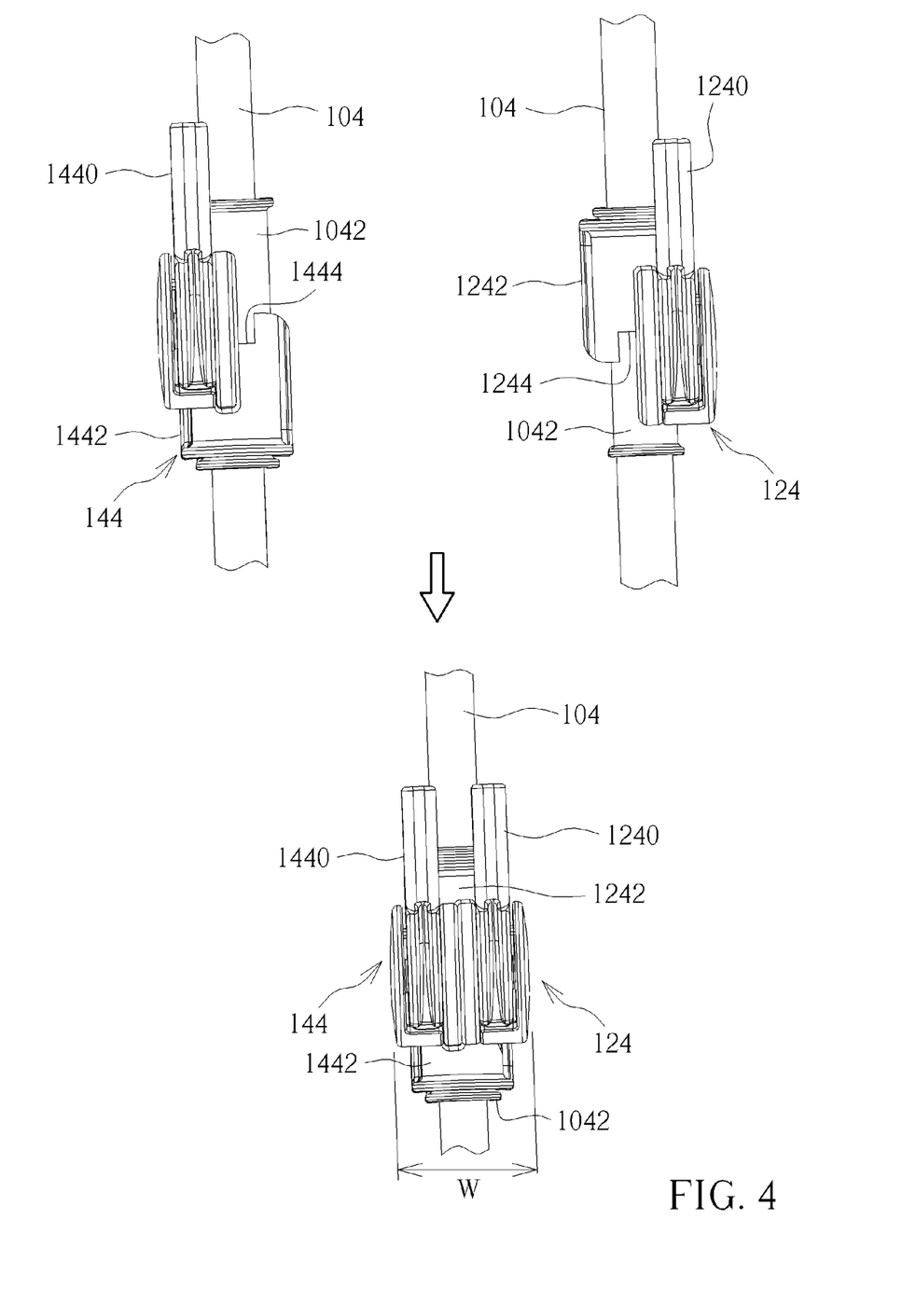
FIG. 4 is an enlarged view illustrating the first fixing portion and the second fixing portion shown in FIG. 1 before and after engagement.
Figure 5:
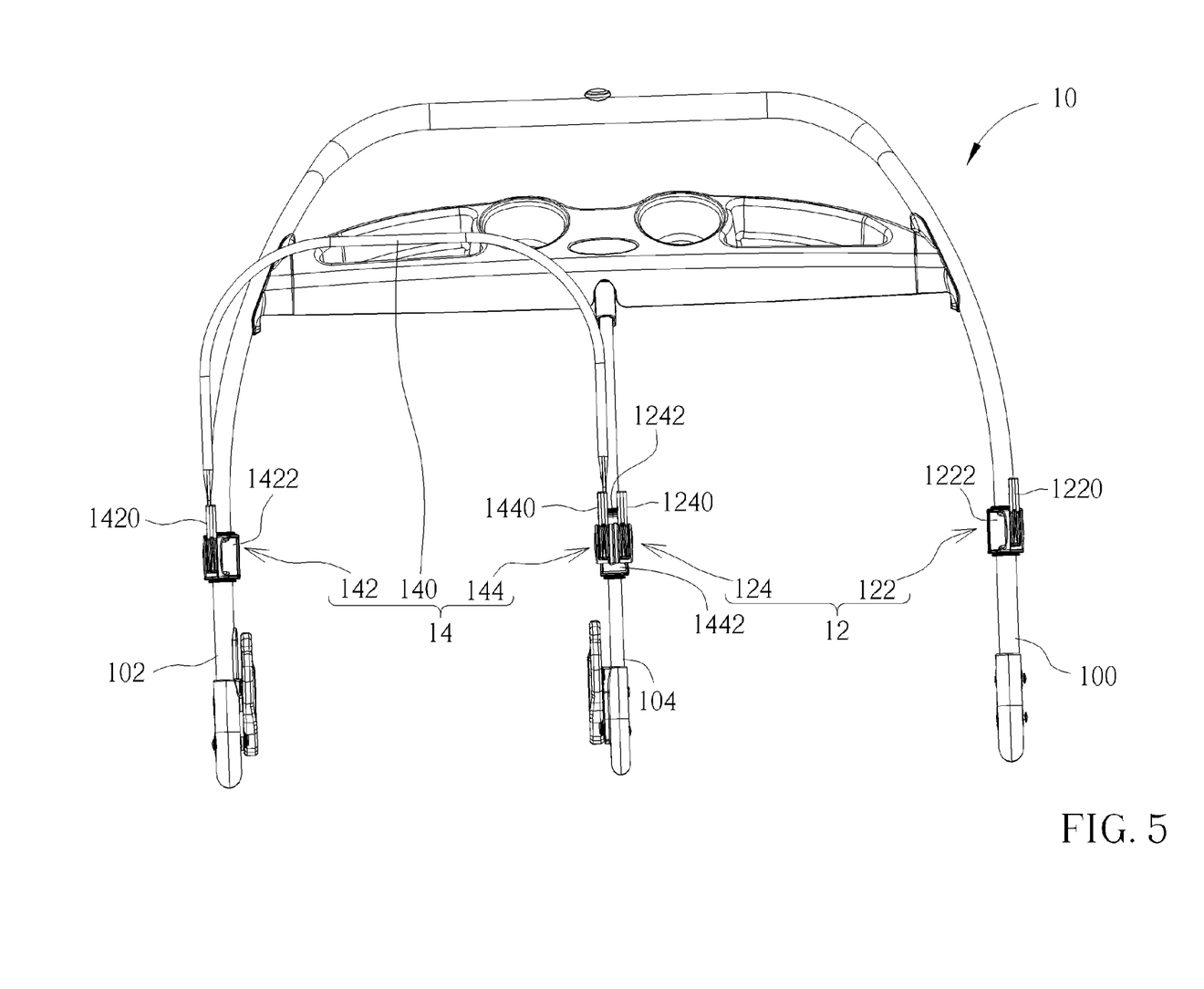
FIG. 5 is a front view illustrating the baby carriage shown in FIG. 2 without the first canopy.
Figure 6:
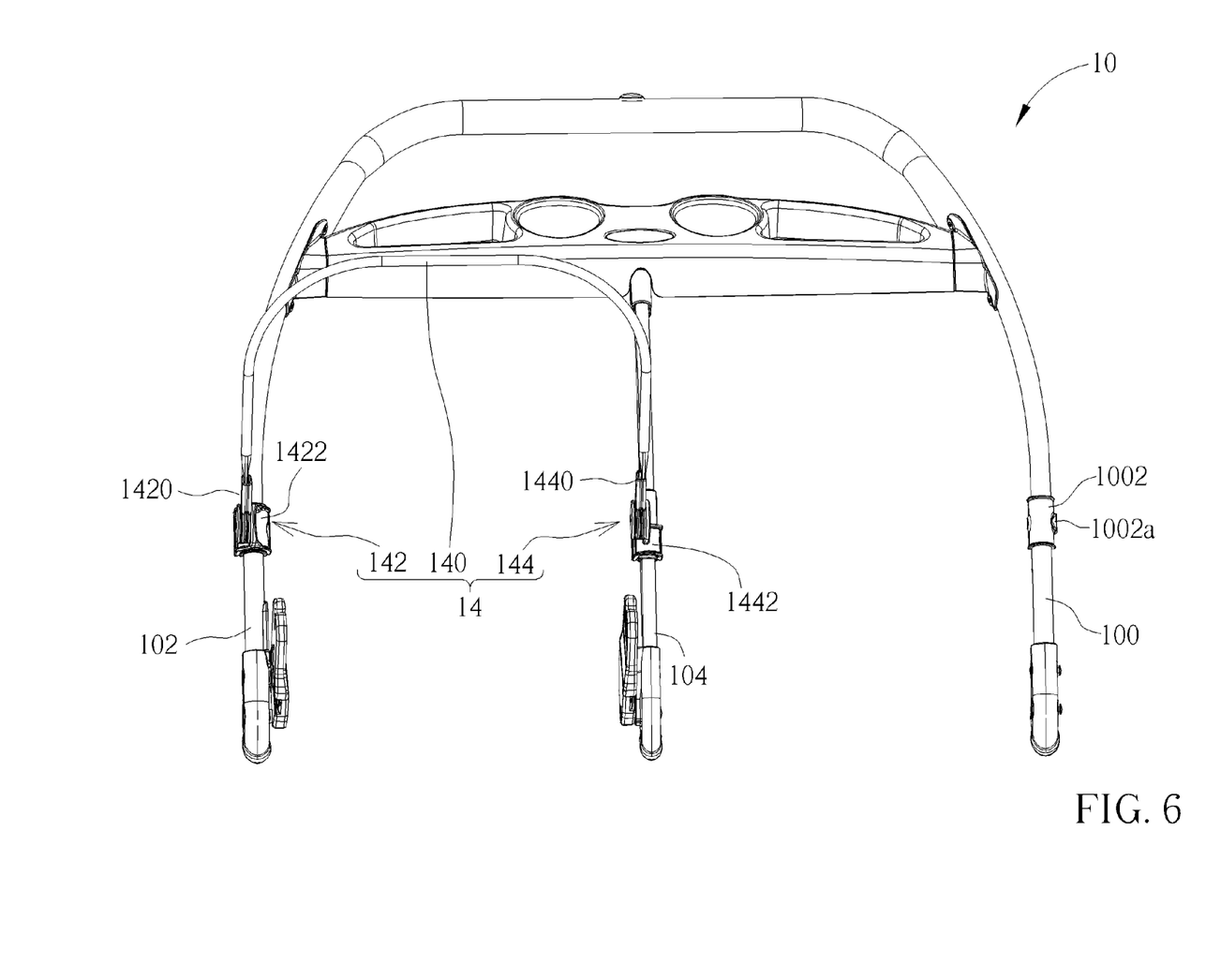
FIG. 6 is a front view illustrating the baby carriage shown in FIG. 2 without the first canopy mechanism.
Figure 7:
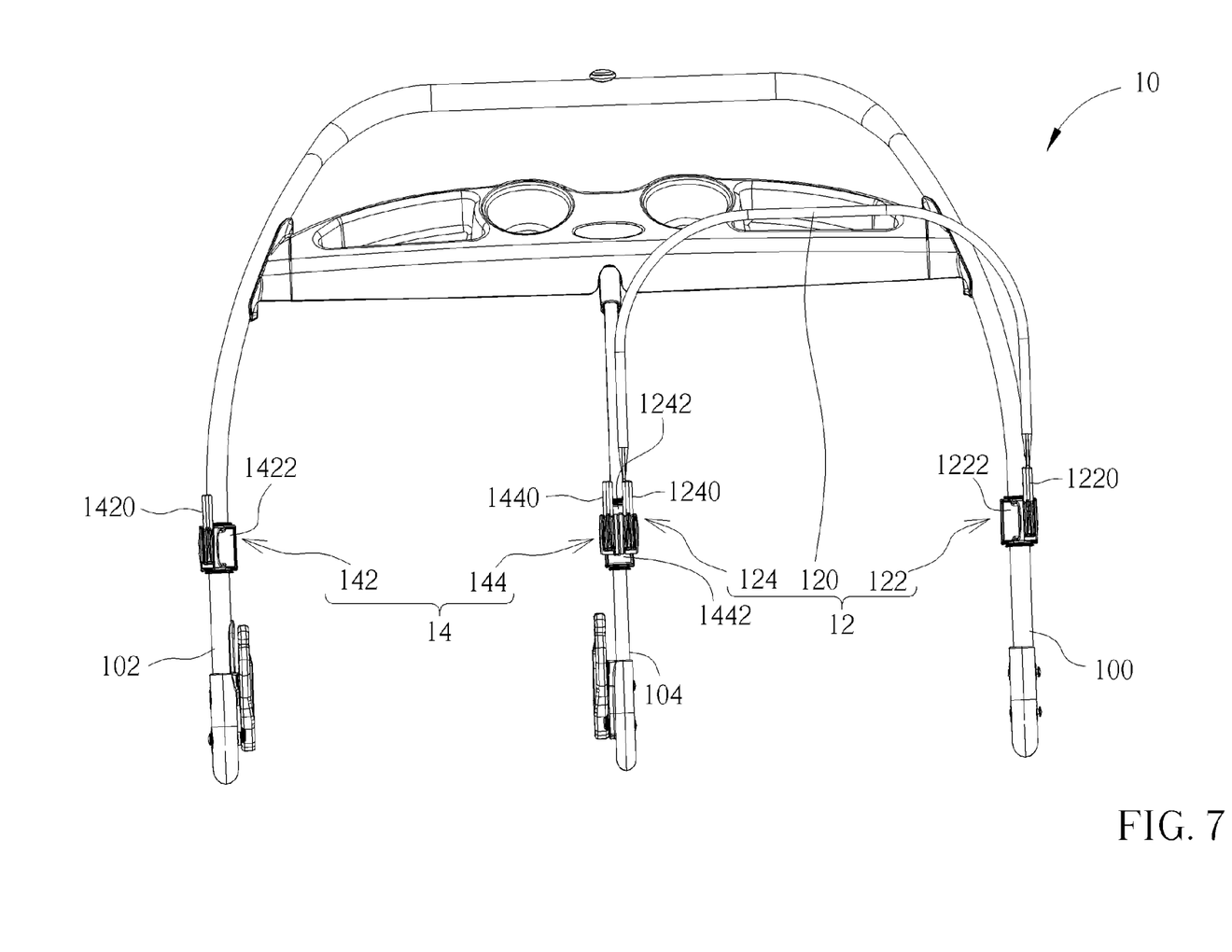
FIG. 7 is a front view illustrating the baby carriage shown in FIG. 2 without the second canopy.
Figure 8:
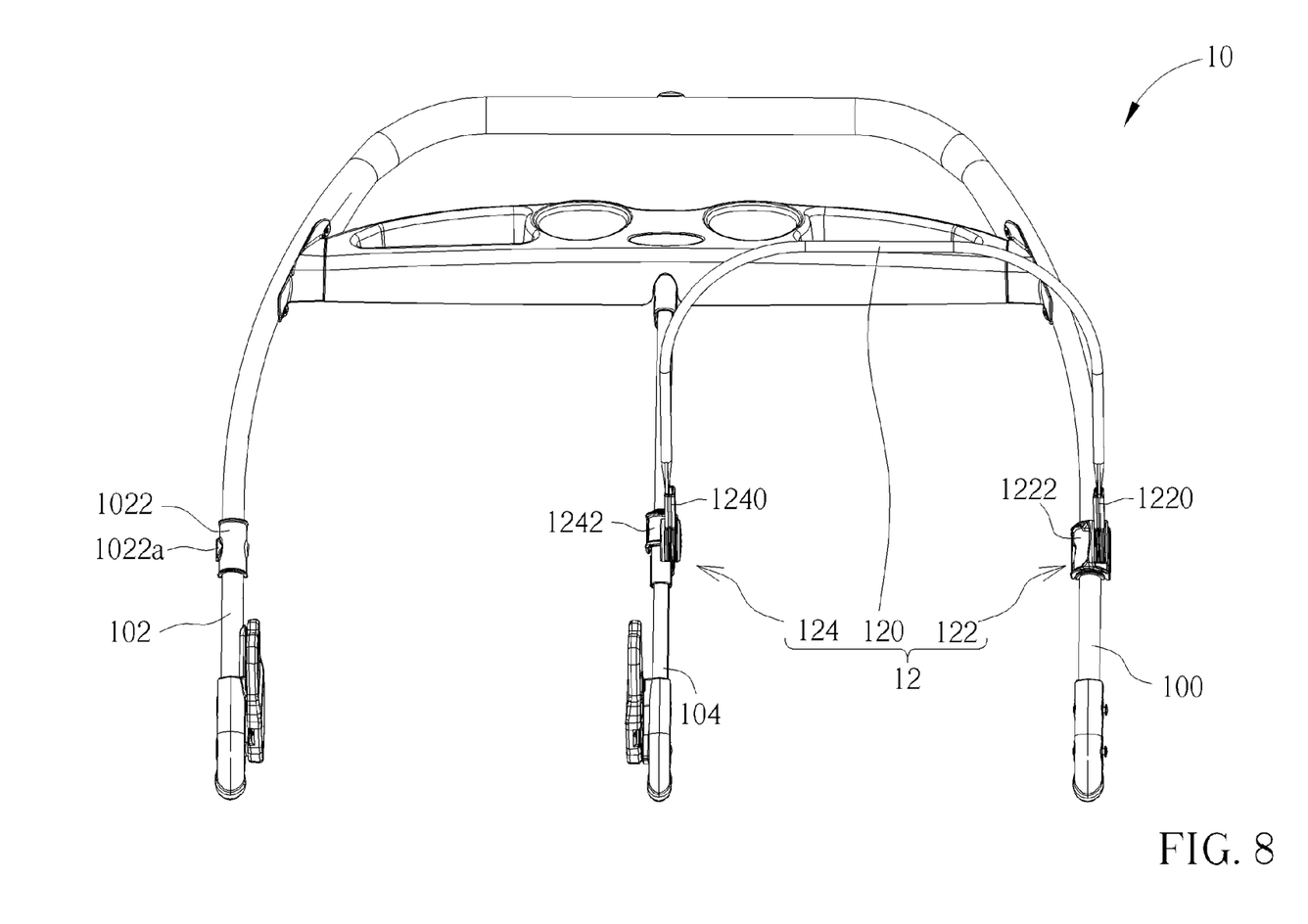
FIG. 8 is a front view illustrating the baby carriage shown in FIG. 2 without the second canopy mechanism.

Referring to FIGS. 1 to 8, FIG. 1 is a perspective view illustrating a baby carriage 1 according to an embodiment of the invention, FIG. 2 is a front view illustrating an upper part of the baby carriage 1 shown in FIG. 1, FIG. 3 is an enlarged side view illustrating the first fixing portion 1242 and the second fixing portion 1442 shown in FIG. 1, FIG. 4 is an enlarged view illustrating the first fixing portion 1242 and the second fixing portion 1442 shown in FIG. 1 before and after engagement, FIG. 5 is a front view illustrating the baby carriage 1 shown in FIG. 2 without the first canopy 120, FIG. 6 is a front view illustrating the baby carriage 1 shown in FIG. 2 without the first canopy mechanism 12, FIG. 7 is a front view illustrating the baby carriage 1 shown in FIG. 2 without the second canopy 140, and FIG. 8 is a front view illustrating the baby carriage 1 shown in FIG. 2 without the second canopy mechanism 14.

As shown in FIGS. 1 to 8, the baby carriage 1 comprises a frame 10, a first canopy mechanism 12 and a second canopy mechanism 14. The baby carriage 1 is exemplified by stroller, but also can include infant crib, playard, high chair, infant swing, child car seat, booster, infant carrier, etc. The frame 10 comprises a first side tube 100, a second side tube 102 and a central tube 104, wherein the central tube 104 is located between the first side tube 100 and the second side tube 102. In this embodiment, the first side tube 100 and the second side tube 102 may be, but not limited to, opposite ends of a U-shaped handle. In practical applications, the baby carriage 1 may be equipped with some necessary components, such as parent tray, cup holder, foldable mechanism, brake mechanism, wheels and so on.

The first canopy mechanism 12 comprises a first canopy 120, a first side socket 122 and a first central socket 124, wherein the first side socket 122 is connected on the first side tube 100, the first central socket 124 is connected on the central tube 104, and opposite ends of the first canopy 120 are connected to the first side socket 122 and the first central socket 124 respectively. In practical applications, a fabric (not shown) may be disposed on the first canopy 120. In this embodiment, the first canopy 120 is removable along with the first side socket 122 and the first central socket 124.

In this embodiment, the first central socket 124 has a first pivotal portion 1240 and a first fixing portion 1242, wherein the first fixing portion 1242 is connected on the central tube 104, the first pivotal portion 1240 is pivotally connected to the first fixing portion 1242, and an end of the first canopy 120 is connected to the first pivotal portion 1240. As shown in FIG. 3, the first pivotal portion 1240 has a first cantilever arm 1241 and a first engaging bump 1241a protruding form first cantilever arm 1241 inwardly. The first canopy 120 has an engaging hole (not shown) for engaging with the engaging bump 1241a, so the first canopy 120 is removable through deflection of the cantilever arm 1241. Likewise, the second pivotal portion 1440 has a second cantilever arm 1441 and a second engaging bump 1441a protruding from the second cantilever arm 1441 inwardly.

Furthermore, the first side socket 122 has a third pivotal portion 1220 and a third fixing portion 1222, wherein the third fixing portion 1222 is connected on the first side tube 100, the third pivotal portion 1220 is pivotally connected to the third fixing portion 1222, and the other end of the first canopy 120 is connected to the third pivotal portion 1220. Accordingly, the first canopy 120 can rotate with respect to the frame 10 through the first pivotal portion 1240 and the third pivotal portion 1220. In practical applications, the first fixing portion 1242 and the third fixing portion 1222 may be c-shaped clips detachably clamping the central tube 104 and the first side tube 100 so that the first central socket 124 and the first side socket 122 are removable from the central tube 104 and the first side tube 100 easily. Preferably, a bracket 1042 is disposed on the central tube 104 and two engaging bumps 1042a are formed on the bracket and opposite to each other. It should be noted that there is only one engaging bump 1042a shown in FIG. 3 due to the viewing angle. A second engaging hole 1442a is formed on the second fixing portion 1442 for engaging with the engaging bump 1042a. Similarly, the other one engaging bump is formed on the other side of the bracket 1042 and a first engaging hole (not shown, like the second engaging hole 1442a) is formed on the first fixing portion 1242 for engaging with the corresponding engaging bump. Similarly, referring to FIGS. 1, 6 and 8, the first side tube 100 and the second side tube 102 has a bracket 1002 and a bracket 1022, respectively, wherein an engaging bump 1002a and an engaging bump 1022a are formed on the bracket 1002 and the bracket 1022, respectively. The engaging bump 1002a and the engaging bump 1022a are used for engaging with an engaging hole 1222a of the third fixing portion 1222 and an engaging hole (not shown) of the fourth fixing portion 1422.

Furthermore, opposite ends of the first canopy 120 may be connected to the first pivotal portion 1240 and the third pivotal portion 1220 by snap-on connecting structures (as shown in FIG. 3) such that the first canopy 120 can be removed easily, as shown in FIG. 5. However, the first canopy 120 is also removable along with the first side socket 122 and the first central socket 124, as shown in FIG. 6. However, in another embodiment, the first fixing portion 1242 and the third fixing portion 1222 can also be fixed on the central tube 104 and the first side tube 100 by screws, engaging structures or other fixing structures. In another embodiment, the first canopy 120 can also be fixed by screws, engaging structures or other fixing structures.

The second canopy mechanism 14 comprises a second canopy 140, a second side socket 142 and a second central socket 144, wherein the second side socket 142 is connected on the second side tube 102, the second central socket 144 is connected on the central tube 104, and opposite ends of the second canopy 140 are connected to the second side socket 142 and the second central socket 144 respectively. In practical applications, a fabric (not shown) may be disposed on the first canopy 120. In this embodiment, the second canopy 140 is removable along with the second side socket 142 and the second central socket 144.

In this embodiment, the second central socket 144 has a second pivotal portion 1440 and a second fixing portion 1442, wherein the second fixing portion 1442 is connected on the central tube 104, the second pivotal portion 1440 is pivotally connected to the second fixing portion 1442, and an end of the second canopy 140 is connected to the second pivotal portion 1440. Furthermore, the second side socket 142 has a fourth pivotal portion 1420 and a fourth fixing portion 1422, wherein the fourth fixing portion 1422 is connected on the second side tube 102, the fourth pivotal portion 1420 is pivotally connected to the fourth fixing portion 1422, and the other end of the second canopy 140 is connected to the fourth pivotal portion 1420. Accordingly, the second canopy 140 can rotate with respect to the frame 10 through the second pivotal portion 1440 and the fourth pivotal portion 1420. In practical applications, the second fixing portion 1442 and the fourth fixing portion 1422 maybe c-shaped clips (as shown in FIG. 3) detachably clamping the central tube 104 and the second side tube 102 so that the second central socket 144 and the second side socket 142 are removable from the central tube 104 and the second side tube 102 easily. Furthermore, opposite ends of the second canopy 140 may be connected to the second pivotal portion 1440 and the fourth pivotal portion 1420 by snap-on connecting structures as shown in FIG. 3 such that the second canopy 140 can be removed easily, as shown in FIG. 7.

However, in another embodiment, the second canopy 140 can also be fixed by screws, engaging structures or other fixing structures, and the second canopy 140 is removable along with the second side socket 142 and the second central socket 144, as shown in FIG. 8. Besides, in another embodiment, the second fixing portion 1442 and the fourth fixing portion 1422 may be fixed on the central tube 104 and the second side tube 102 by screws, engaging structures or other fixing structures.

In this embodiment, the first central socket 124 and the second central socket 144 stand side by side on the central tube 104. As shown in FIG. 2, the central tube 104 has a first central axis A1. In this embodiment, the first pivotal portion 1240 and the second pivotal portion 1440 are arranged at opposite sides of the first central axis A1, respectively, such that the first pivotal portion 1240 and the second pivotal portion 1440 can nest with each other to reduce overall size of central canopy pivot when both canopies are attached to the frame 10.

Preferably, as shown in FIG. 3, the first fixing portion has a first extending portion 1242a, the second fixing portion 1442 has a second extending portion 1442c, the first extending portion 1242a has a first circular casing 1242b, and the second extending portion 1442c has a second circular casing 1442b. The first extending portion 1242a and the second extending portion 1442c are extended upwardly from an end where the first fixing portion 1242 and the second fixing portion 1442 abut against each other and form the first circular casing 1242b and the second circular casing 1442b, respectively, wherein the first circular casing 1242b and the second circular casing 1442b protrude from an edge where the first fixing portion 1242 and the second fixing portion 1442 abut against each other. The first pivotal portion 1240 and the second pivotal portion 1440 are pivotally connected in the first circular casing 1242b and the second circular casing 1442b, respectively, such that the first circular casing 1242b and the second circular casing 1442b nest with each other at opposite sides of the first central axis A1. Specifically, an axle center of the first pivotal portion 1240 and an axle center of the second pivotal portion 1440 are substantially coaxial.

Furthermore, the first fixing portion 1242 and the second fixing portion 1442 are arranged top and bottom along the first central axis A1. Accordingly, the first canopy mechanism 12 and the second canopy mechanism 14 can get closer to each other on the central tube 104 such that the overall width W of portions of the first canopy mechanism 12 and the second canopy mechanism 14 on the central tube 104 is greatly reduced. Therefore, the first canopy mechanism 12 and the second canopy mechanism 14 occupy less space than the conventional canopy mechanisms. It should be noted that the first fixing portion 1242 may have a first engaging structure 1244 and the second fixing portion 1442 may have a second engaging structure 1444. When the first fixing portion 1242 and the second fixing portion 1442 are connected on the central tube 104, the first fixing portion 1242 and the second fixing portion 1442 may be engaged with each other through the first engaging structure 1244 and the second engaging structure 1444, as shown in FIGS. 3 and 4.

Still further, as shown in FIG. 2, the first side tube 100 has a second central axis A2 and the second side tube 102 has a third central axis A3. In this embodiment, the third pivotal portion 1220 deviates from the second central axis A2 outwardly and the fourth pivotal portion 1420 deviates from the third central axis A3 outwardly. Accordingly, the first canopy 120 and the second canopy 140 can be enlarged in width as much as possible.

Figure 9:
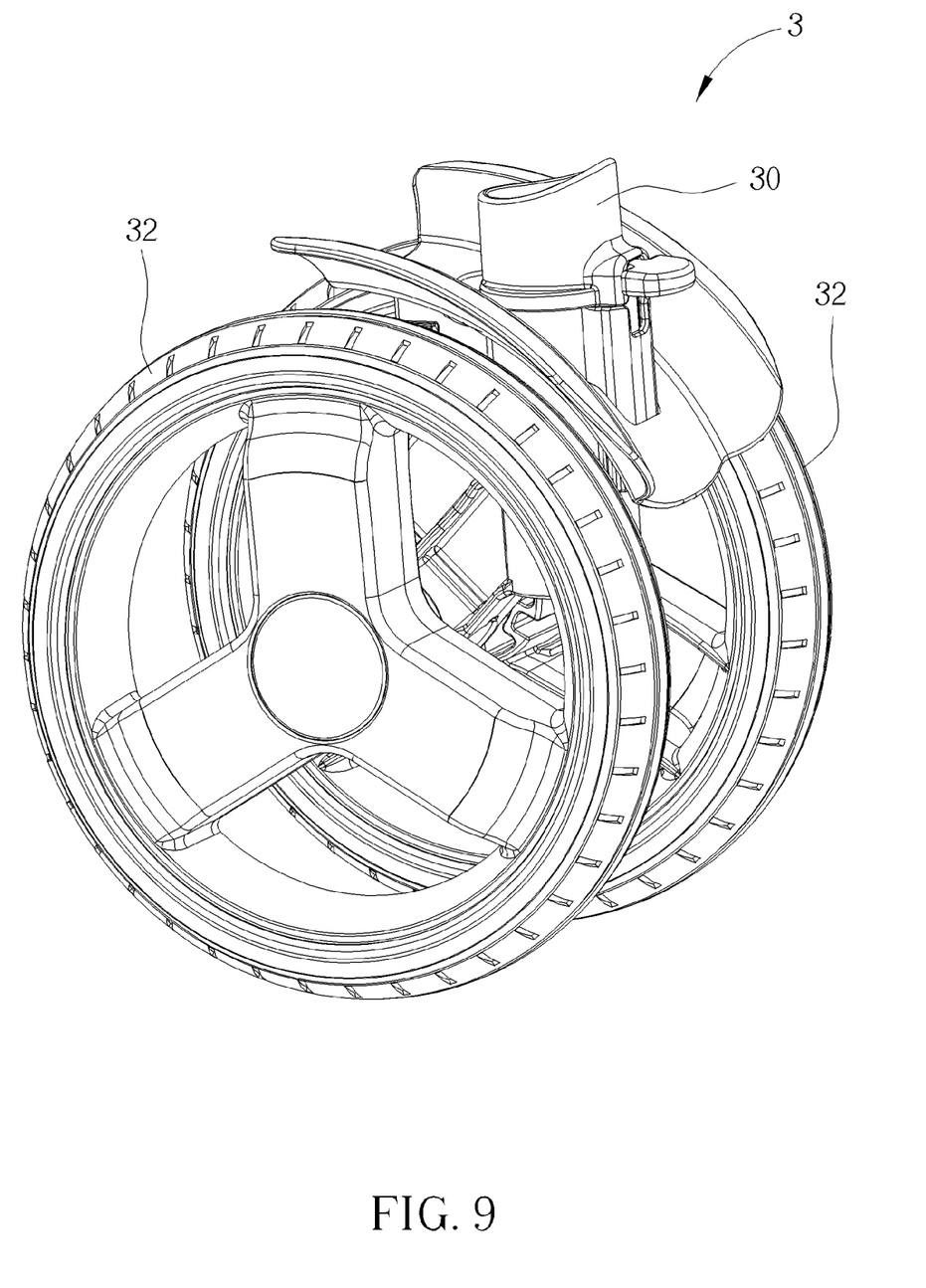
FIG. 9 is a perspective view illustrating a suspension mechanism according to another embodiment of the invention.
Figure 10:
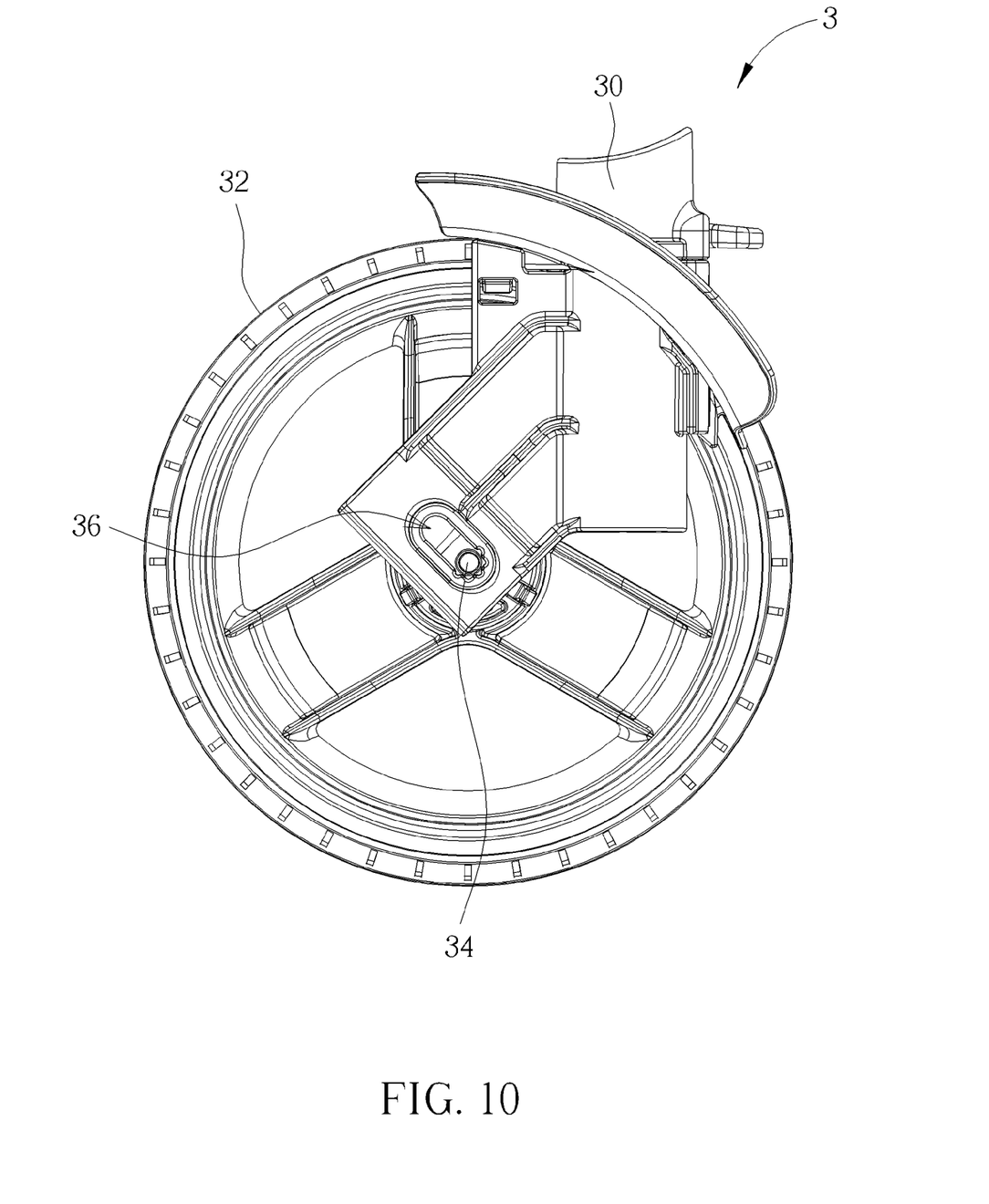
FIG. 10 is a side view illustrating the suspension mechanism shown in FIG. 9 removing one of the wheels.
Figure 11:
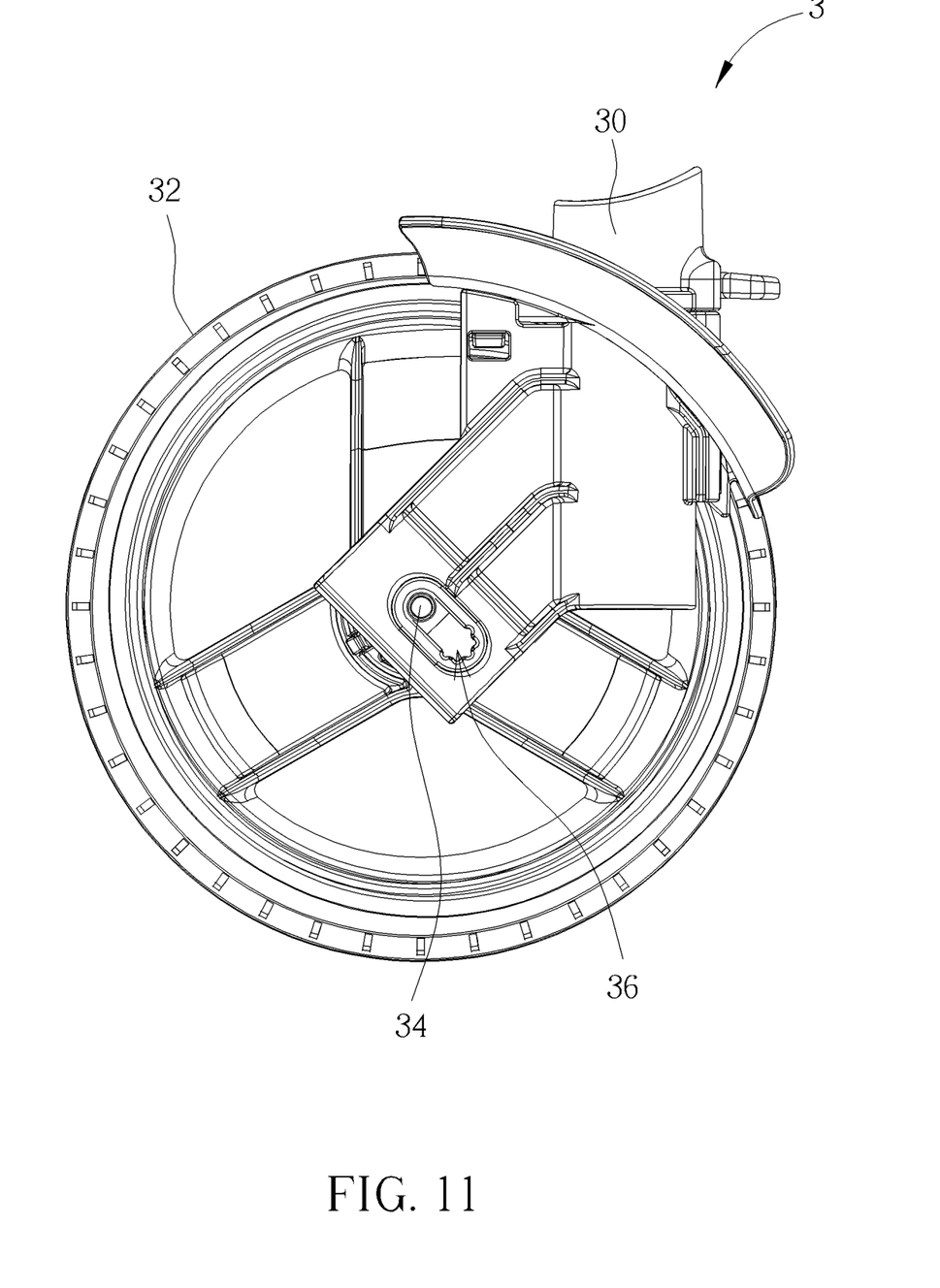
FIG. 11 is a side view illustrating the axle shown in FIG. 10 moving from one end to the other end of the slot.
Figure 12:
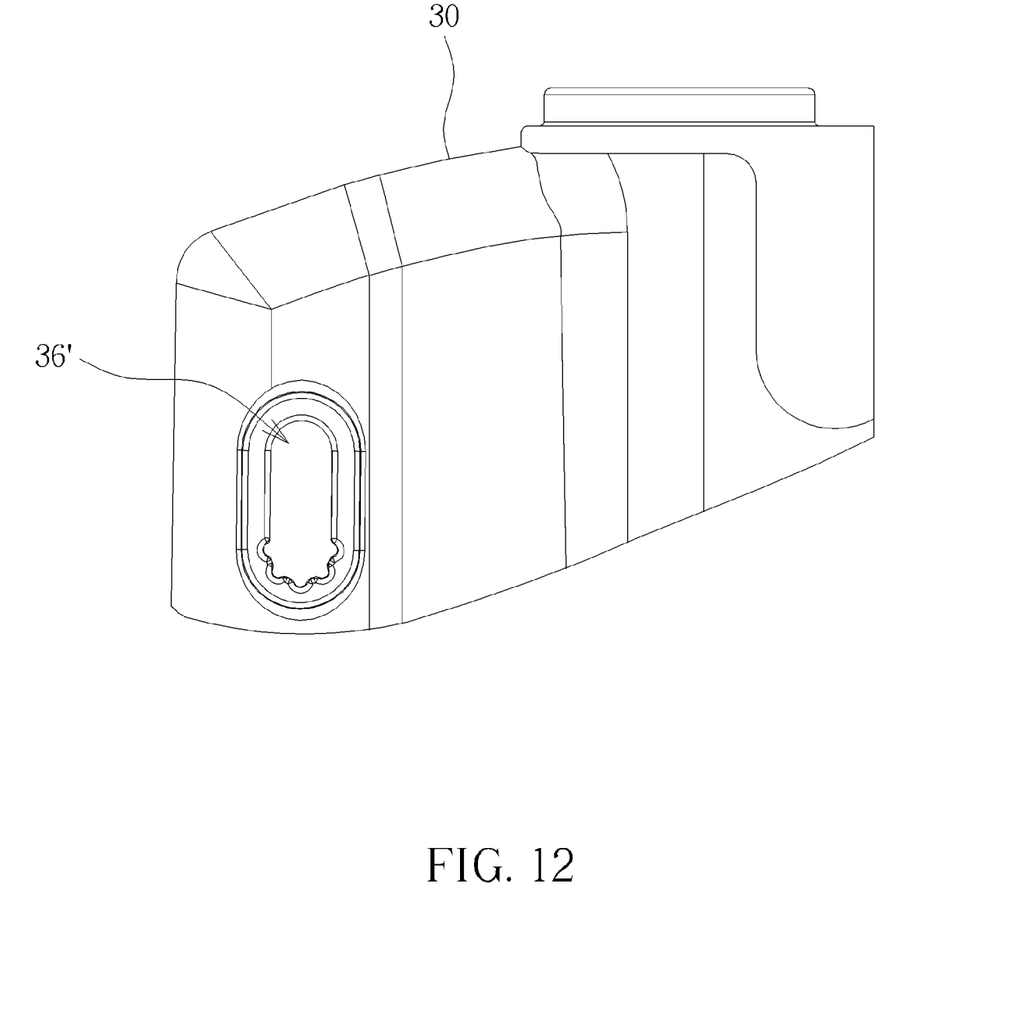
FIG. 12 is a schematic diagram illustrating a vertical slot according to another embodiment of the invention.

Referring to FIGS. 9 to 12, FIG. 9 is a perspective view illustrating a suspension mechanism 3 according to another embodiment of the invention, FIG. 10 is a side view illustrating the suspension mechanism 3 shown in FIG. 9 removing one of the wheels 32, FIG. 11 is a side view illustrating the axle 34 shown in FIG. 10 moving from one end to the other end of the slot 36, and FIG. 12 is a schematic diagram illustrating a vertical slot 36' according to another embodiment of the invention. The suspension mechanism 3 shown in FIG. 9 can be applied to the aforesaid baby carriage 1.

As shown in FIGS. 9 to 11, the suspension mechanism 3 comprises a support member 30, two wheels 32 and an axle 34. A slot 36 is formed on the support member 30 such that the axle 34 can pass through the slot 36 to connect the two wheels 32. In this embodiment, the slot is oblique and allows the axle 34 to move upward and rearward when compressed, as shown in FIGS. 10 and 11. Accordingly, the suspension mechanism 3 can work not only as a means of comforting the ride, but also as a shock absorber when the wheels 32 are impacted with objects from the front. The amount of vertical travel can be reduced and still allow for the same overall suspension travel of a vertical slot 36', as shown in FIG. 12.

As mentioned in the above, the baby carriage of the invention is equipped with two individual canopy mechanisms (i.e. the aforesaid first and second canopy mechanisms) for installing two canopies. Since the first pivotal portion and the second pivotal portion are arranged at opposite sides of the central axis of the central tube, and the first fixing portion and the second fixing portion are arranged top and bottom along the central axis of the central tube, the two canopy mechanisms can get closer to each other on the central tube such that the overall width of the two canopy mechanisms on the central tube is greatly reduced. Accordingly, the two canopy mechanisms occupy less space than the conventional canopy mechanisms. Furthermore, the invention allows any one of the first and second canopies along with the first and second canopy mechanisms to be removed individually and does not hinder the usage of the other canopy, so as to increase their use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A baby carriage comprising:
   a frame comprising a first side tube, a second side tube and a central tube, the central tube being located between the first side tube and the second side tube;
   a first canopy mechanism comprising a first canopy, a first side socket and a first central socket, the first side socket being connected on the first side tube, the first central socket being connected on the central tube, opposite ends of the first canopy being connected to the first side socket and the first central socket respectively; and
   a second canopy mechanism comprising a second canopy, a second side socket and a second central socket, the second side socket being connected on the second side tube, the second central socket being connected on the central tube, opposite ends of the second canopy being connected to the second side socket and the second central socket respectively;
   wherein the first central socket and the second central socket stand side by side on the central tube;
   wherein the central tube has a first central axis, the first central socket has a first pivotal portion, an end of the first canopy is connected to the first pivotal portion, the second central socket has a second pivotal portion, an end of the second canopy is connected to the second pivotal portion, and the first pivotal portion and the second pivotal portion are arranged at opposite sides of the first central axis, respectively;
   wherein the first central socket further has a first fixing portion connected on the central tube, the first pivotal portion is pivotally connected to the first fixing portion, the second central socket further has a second fixing portion connected on the central tube, the second pivotal portion is pivotally connected to the second fixing portion, and the first fixing portion and the second fixing portion are arranged top and bottom along the first central axis.

2. The baby carriage of claim 1, wherein the first fixing portion has a first extending portion, the second fixing portion has a second extending portion, the first extending portion has a first circular casing, and the second extending portion has a second circular casing.

3. The baby carriage of claim 2, wherein the first extending portion and the second extending portion are extended from an end where the first fixing portion and the second fixing portion abut against each other, and the first circular casing and the second circular casing protrude from an edge where the first fixing portion and the second fixing portion abut against each other.

4. The baby carriage of claim 1, wherein the first fixing portion has a first engaging structure, the second fixing portion has a second engaging structure, the first fixing portion and the second fixing portion are engaged with each other through the first engaging structure and the second engaging structure.

5. The baby carriage of claim 1, wherein the first fixing portion has a first cantilever arm and an engaging bump protruding from the first cantilever arm inwardly; the second fixing portion has a second cantilever arm and a second engaging bump protruding from the second cantilever arm inwardly.

6. The baby carriage of claim 1, wherein a bracket is disposed on the central tube, two engaging bumps are formed on the bracket, a first engaging hole is formed on the first fixing portion for engaging with one of the engaging bumps, and a second engaging hole is formed on the second fixing portion for engaging with the other one of the engaging bumps.

7. The baby carriage of claim 1, wherein the first canopy is removable from the first side socket and the first central socket, and the second canopy is removable from the second side socket and the second central socket.

8. The baby carriage of claim 1, wherein the first central socket and the second central socket are removable from the central tube.

9. The baby carriage of claim 1, wherein the first side socket and the second side socket are removable from the first side tube and the second side tube respectively.

10. The baby carriage of claim 1, wherein the first side tube has a second central axis, the first side socket has a third pivotal portion, an end of the first canopy is connected to the third pivotal portion, and the third pivotal portion deviates from the second central axis outwardly.

11. The baby carriage of claim 1, wherein the second side tube has a third central axis, the second side socket has a fourth pivotal portion, an end of the second canopy is connected to the fourth pivotal portion, and the fourth pivotal portion deviates from the third central axis outwardly.

* * * * *